United States Patent
Steinlechner et al.

(10) Patent No.: US 6,761,075 B2
(45) Date of Patent: Jul. 13, 2004

(54) METHOD FOR DETERMINING A ROTATION ANGLE AND/OR AN ANGLE DIFFERENTIAL FROM PHASE SIGNALS

(75) Inventors: Siegbert Steinlechner, Leonberg (DE); Lutz Dorfmueller, Gerlingen (DE); Axel Wenzler, Stuttgart (DE); Ralf Noltemeyer, Wernau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,099

(22) PCT Filed: Aug. 31, 2001

(86) PCT No.: PCT/DE01/03288

§ 371 (c)(1),
(2), (4) Date: Jun. 26, 2003

(87) PCT Pub. No.: WO02/18894

PCT Pub. Date: Mar. 7, 2002

(65) Prior Publication Data

US 2004/0007663 A1 Jan. 15, 2004

(30) Foreign Application Priority Data

Aug. 31, 2000 (DE) .......................................... 100 42 656

(51) Int. Cl.[7] ............................. G01L 3/02; G01L 3/10; G01L 3/12; G01L 3/14
(52) U.S. Cl. .................................................. 73/862.326
(58) Field of Search ..................... 73/862.326, 862.325, 73/862.321

(56) References Cited

U.S. PATENT DOCUMENTS

| | | | | |
|---|---|---|---|---|
| 4,874,053 A | * | 10/1989 | Kimura et al. | 324/207.21 |
| 6,304,076 B1 | * | 10/2001 | Madni et al. | 324/207.17 |
| 6,520,031 B2 | * | 2/2003 | Madni et al. | 73/862.326 |

FOREIGN PATENT DOCUMENTS

| | | |
|---|---|---|
| DE | 195 06 938 A | 8/1996 |
| EP | 0 980 000 A | 2/2000 |

* cited by examiner

*Primary Examiner*—Edward Lefkowitz
*Assistant Examiner*—Takisha Miller
(74) *Attorney, Agent, or Firm*—Michael J. Striker

(57) ABSTRACT

The invention proposes a method for determining a rotation angle ($\Phi$) and/or an angular difference ($\delta$) in a divided shaft (3), which has a number of phase tracks (1a, 1b, 2a, and 2b) disposed on it, which are provided with codes. Via an evaluation unit, each group of tracks (1a, 1b, 2a, and 2b) supplies a phase signal ($\alpha_1$, $\alpha_2$), which is respectively ambiguous with regard to a rotation of the shaft (3). The at least two phase signals ($\alpha_1$, $\alpha_2$) are added up in a weighted fashion to produce a signal S from which the integer portion and the non-integer portion are calculated. The non-integer portion is proportional to the angular difference ($\delta$) between the two track groups. The torque (M) is determined through multiplication with the spring rate of an interposed torque rod. The unambiguous torque ($\Phi$) is determined from the integer portion of the signal (S) and a phase value ($\alpha_1$) or ($\alpha_2$) with the aid of a weighted addition.

3 Claims, 2 Drawing Sheets

METHOD FOR DETERMINING A ROTATION ANGLE AND/OR AN ANGLE DIFFERENTIAL FROM PHASE SIGNALS

PRIOR ART

In some technical measuring tasks, it is necessary to determine the angular position of a shaft and at the same time, an angular difference in relation to a second (shaft) element. For example, the torque acting on the shaft can be determined from the angular difference between two shaft elements that are connected by means of a torque rod.

One example for its use is a TAS (torque angle sensor), which is attached to the steering shaft of a motor vehicle and is simultaneously intended to output the steering angle and the steering torque (see FIG. 1). To that end, the angles are measured at both ends of a torque element. The torque M is then calculated based on the difference $\delta$ between these angles $$M = c \cdot \delta$$

(c=the spring rate of the torque element).

The individual angle measurements must as a rule be very precise since the generally quite small difference angles are directly influenced by the imprecisions of the two angle measurements.

For example, a number of optical or magnetic code tracks or multi-pole wheels, which are provided with a digital code, are used for the high precision measurement of the individual angles. In a more robust variation, the tracks are not provided with a digital code, but contain various phase data. These phase data are optically or magnetically detected and converted into corresponding (electrical) phase signals, which are evaluated either through single or multiple use of the classic or modified vernier method (e.g. DE 19506938) or the angle measurement occurs with a method for evaluating N-dimensional phase signals.

OBJECT OF THE INVENTION

The object of the invention is the simultaneous and cost-effective determination of angle $\phi$ and angular difference $\delta$ from two ambiguous phase measurements $\alpha_1$ and $\alpha_2$. The angular difference is calculated not as a difference between two angles, but directly and cost-effectively based on the ambiguous phase measurements. At the same time, an unambiguous angle value is obtained from the phase measurements, which are shifted in relation to one another and are ambiguous.

For example, this permits the rotation angle $\phi$ of a shaft and the torque acting on it to be determined simultaneously. The two ambiguous phase signals $\alpha_1$ and $\alpha_2$ are obtained through the use of RADAR, lasers, optical, magnetic, or other sensor principles. It is often necessary to obtain these phase signals in turn from a number of phase tracks (e.g. see the tracks 1a, 1b, 2a, and 2b in FIG. 1) with the aid of the vernier principle (classic or modified, possibly cascaded or N-dimensional).

Another possible use is the determination of the angular difference between two phase tracks, which is a result, for example, of manufacturing or installation tolerances (tilt angle). It is necessary to know this angular difference in order to carry out a possible correction of the errors in the signal evaluation caused by these tolerances.

In particular, the invention is suited for use in a TAS (torque angle sensor).

ADVANTAGES OF THE INVENTION

The essence of the invention is a method and a circuit arrangement for direct and simultaneous determination of angle $\phi$ and angular difference $\delta$ based on two ambiguous phase measurements $\alpha_1$ and $\alpha_2$, which are shifted by the unknown angular difference $\delta$.

By contrast to the known method, it is not necessary to take the indirect route by means of the two absolute angles and this distinctly reduces the wiring cost.

At the same time, the method noticeably reduces the measurement errors in the individual phase tracks.

The improvement over the known method is particularly noticeable if only the angular difference is to be determined. In this case, the block circuit diagram of the device shown in FIG. 2 is further simplified.

DESCRIPTION

The following description is oriented toward a preferred embodiment for measuring angle and torque (TAS). It should be clear to one skilled in the art, however, that the invention can also be used for other applications and embodiments.

Figure 1:
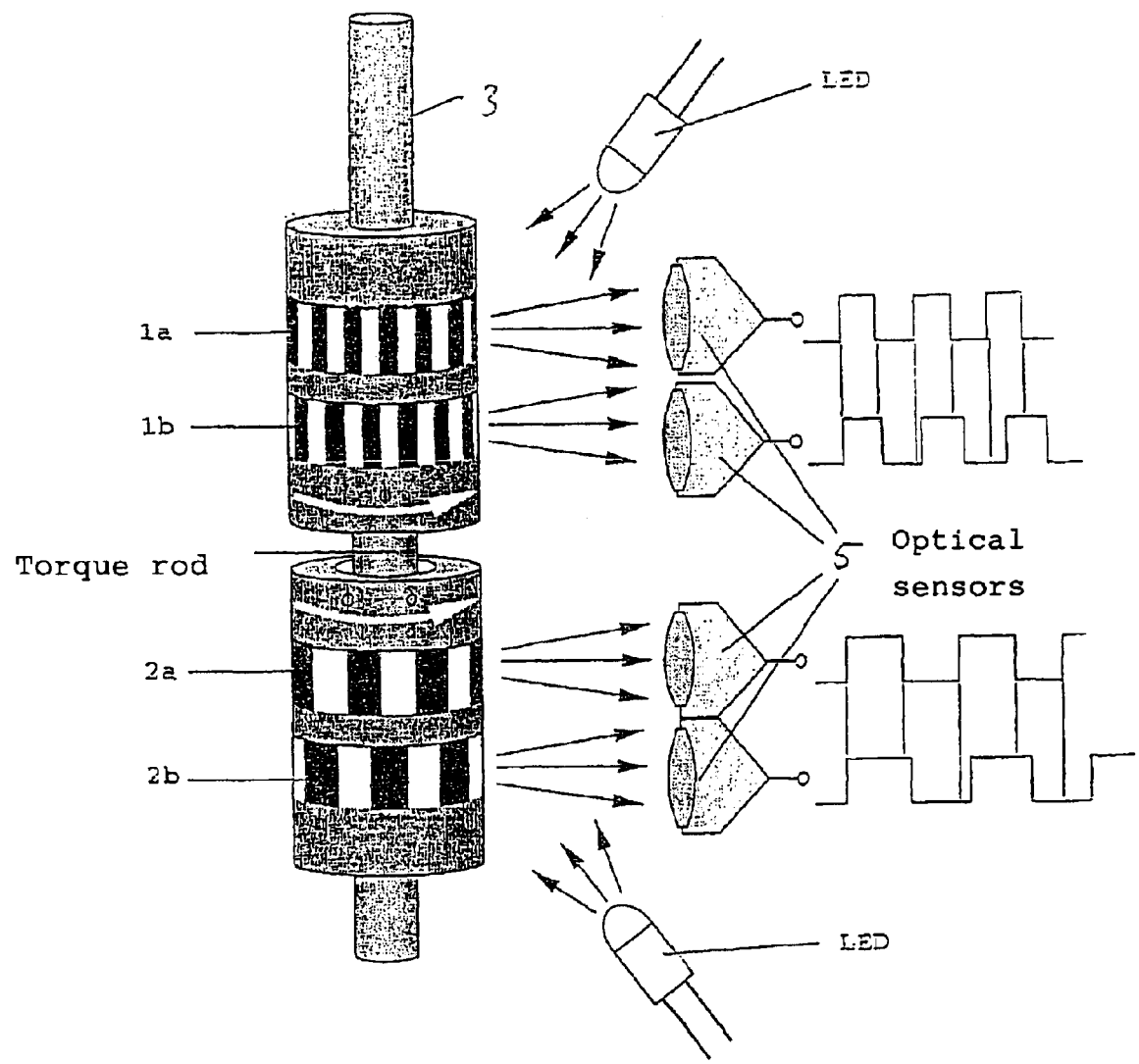
FIG. 1 shows a possible embodiment for an optical angle and torque sensor in which the invention can be used to advantage.

FIG. 1 shows an example of an optical TAS with a total of 4 phase tracks 1a, 1b, 2a, and 2b. Between the upper tracks 1a, 1b and the lower ones (2a, 2b), there is a torque rod. The steering shaft is disposed in the angular position $\phi$. The group of lower tracks (2a, 2b), which has the angle $\delta$ in relation to the upper group (tracks 1a, 1b), is rotated by the torque acting on it.

For example by means of the modified vernier method, a first phase signal $\alpha_1$ is obtained from the two upper tracks 1a, 1b, which signal is related to the mechanical rotation angle $\phi$ of the shaft by means of the relationship $$\alpha_1 = n_1 \cdot \Phi.$$

The same is true of the second phase signal $\alpha_2$ obtained from the lower tracks, $$\alpha_2 = n_2 \cdot (\Phi - \delta)$$

where $n_1$ and $n_2$ are resulting periodicities of the two track groups, i.e. the phase signal obtained from the tracks 1a and 1b is repeated $n_1$ times in a (mechanical) rotation; $\delta$ is the angular difference between the two track groups. The actual measurement values of the phase signals always lie in the range from 0 to $2\pi$, i.e. they are always determined only up to integral multiples of $2\pi$.

All in all, one sensor (FIG. 2) thus supplies the two phase signals $\alpha_1$ and $\alpha_2$, which as a rule are in digital form. These signals are first summed up in weighted fashion, yielding the signal S. For example, this addition can be executed as follows:

$$S = \frac{1}{2\pi}(n_2 \cdot \alpha_1 - n_1 \cdot \alpha_2)$$

The rounding of this signal to integer values yields the integral signal W, which in turn is subtracted from S. The result of this operation yields the signal D, the non-integer portion of S. In a digital implementation, this non-integer portion can often simply be obtained directly from the numeric representation of S.

The signal D is directly proportional to the angular difference δ and is consequently a measure for the differential angle or the torque and can be rescaled into the torque as needed with the aid of a multiplier.

Figure 2:
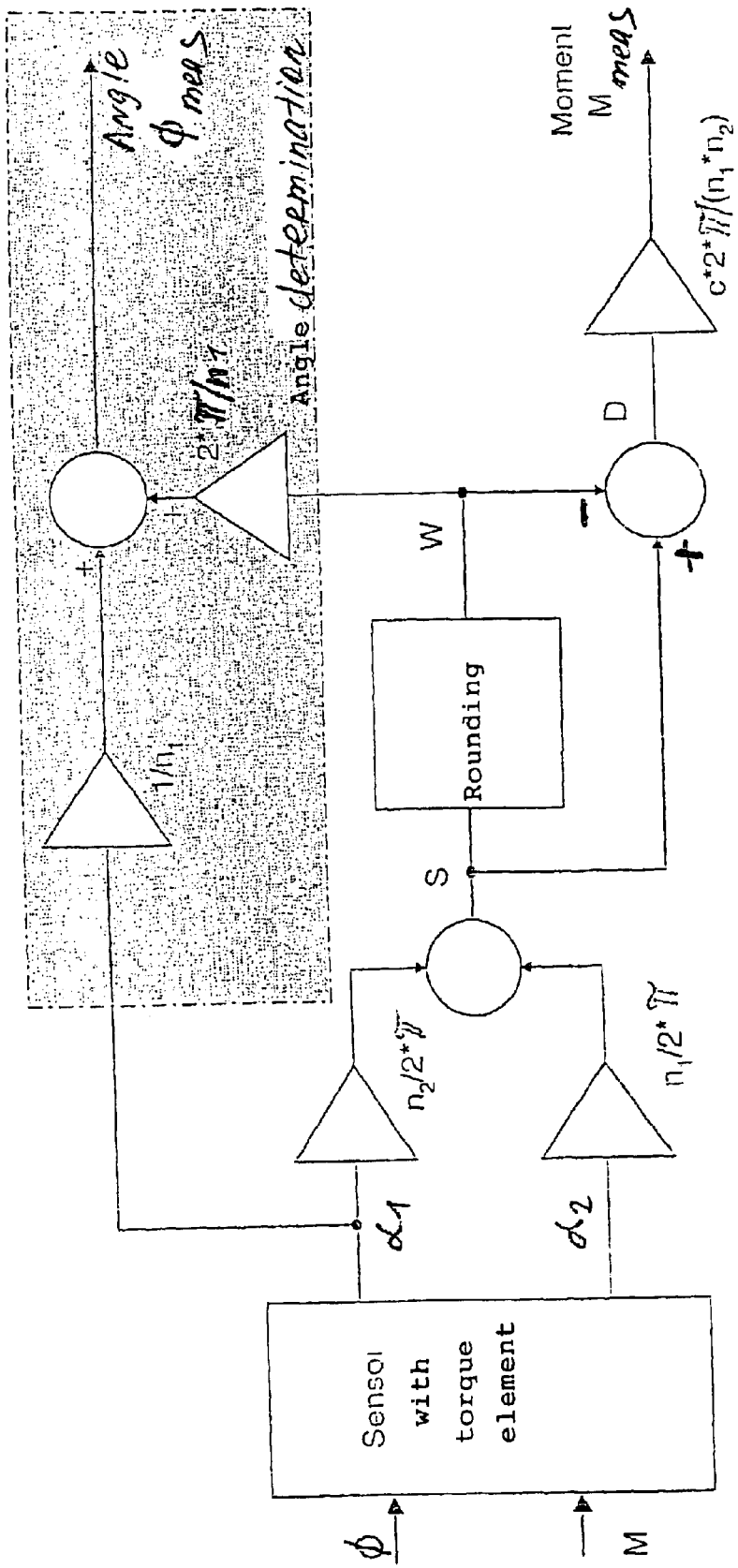
FIG. 2 shows the block circuit diagram of the device for determining angle and torque.

At the same time, the angle φ can be obtained from the integral signal W and the phase value $\alpha_1$ with the aid of a weighted addition. This addition is executed in modulo $2\pi$ fashion. For the case in which $n_1=n_2+1$, the angle φ is calculated as shown in FIG. 2:

$$\Phi_{meas} = \frac{\alpha_1}{n_1} + \frac{W \cdot 2 \cdot \pi}{n_1}$$

The proposed circuit arrangement further reduces the measurement errors $e_1$ and $e_2$ present in the two phase signals $\alpha_1$ and $\alpha_2$ by the periodicities:

error in the angle φ: $e_1/n_1$
error in the differential angle δ: $e_2/n_2 - e_1/n_1$ The following points must also be taken into account in the size and design of the device:

If the intent is to determine an unambiguous angle f then the periodicities $n_1$ and $n_2$ are not permitted to contain a common divisor.

The product of $n_1$ and $n_2$ determines the maximal permissible angle difference. When $|\delta|<6°$, then $n_1 n_2 </= 30$, for example.

If the angle values are depicted in binary fashion, normalized to $2\pi$, then all necessary multiplications can be executed integrally or rationally.

The method is particularly suited for the TAS (torque angle sensor).

The necessary weights and multiplier coefficients only have to be determined once when the system is designed.

The method can also be used in a very favorable manner to determine the (fixed) angular difference between phase tracks, which result from installation tolerances (tilt angle), for example.

If only the angular difference is needed, then the device is further simplified (the shaded area in FIG. 2 does not have to be provided in this case); this further increases the advantage over the prior method.

If only the angular difference is needed, then the periodicities $n_1$ and $n_2$ are permitted to contain a common divisor; however, it is then in principle not possible to make an unambiguous determination of the angle φ.

The method can also be transferred to other systems, which supply corresponding output signals, e.g. linear transmitters and multifrequency distance measuring systems.

The proposed device can be embodied in an analog or digital fashion.

The proposed wiring can be very easily embodied in a digital evaluation circuit.

What is claimed is:

1. A method for determining a rotation angle (Φ) and/or an angular difference (δ) in a divided shaft (3) with phase tracks (1a, 1b, 2a, and 2b) and an interposed torque rod, wherein associated sensors (5) and an evaluation unit are used to obtain respective ambiguous phase signals ($\alpha_1$, $\alpha_2$) with regard to a rotation of the shaft (3), characterized in that at least two phase signals ($\alpha_1$, $\alpha_2$) are added up in a weighted fashion to produce a signal S, that a non-integer portion D of the signal S is calculated, wherein the portion D is proportional to the angular difference (δ), and that the torque (M) acting on the shaft (3) is determined from the angular difference (δ) through multiplication with the spring rate (C) of the interposed torque rod.

2. The method according to claim 1, characterized in that the unambiguous torque (Φ) is unambiguously determined from the integer portion of the signal S and the phase measurement value ($\alpha_1$ or $\alpha_2$) with the aid of a weighted addition.

3. The method according to claim 1 or 2, characterized in that the rotation angle is the steering angle of the steering shaft of a motor vehicle and the torque is the steering force.

* * * * *